Patented Apr. 20, 1954

2,676,091

UNITED STATES PATENT OFFICE 2,676,091

METHOD OF PREPARING POWDERED SILOXANES

Arthur J. Barry and Donald E. Hook, Midland, Mich., assignors to Dow Corning Corporation, Midland, Mich., a corporation of Michigan No Drawing. Application October 31, 1951, Serial No. 254,202

4 Claims. (Cl. 23—182)

This invention relates to a method of preparing powdered siloxanes by the hydrolysis of chlorosilanes.

It is the object of this invention to provide an economically feasible method for preparing powdered siloxanes by the direct hydrolysis of chlorosilanes. Another object is to avoid the necessity of employing solvents in the preparation of finely divided silica powder. Another object is to prepare directly hydrophobic silica powder. Another object is to prepare, by direct hydrolysis without the necessity of employing solvents or spray drying, a powdered moldable siloxane resin.

In accordance with this invention, a chlorosilane of the formula $R_nSiCl_{4-n}$ where R is an alkyl radical of less than 7 carbon atoms, a phenyl radical or a hydrogen atom, there being no more than 1 H atom per silicon, and $n$ has a value from 0 to 1.5, is vaporized and the vapors mixed with an inert gas in amount so that the per cent by volume of chlorosilane vapor in the silane-gas mixture is less than 80 per cent. The silane-inert gas mixture is then contacted with water whereupon the chlorosilane hydrolyzes to give a powdered siloxane.

Either a single silane or a mixture of two or more silanes may be employed in this invention. In all cases, however, the number of R groups per silicon should not be greater than 1.5. Thus, any combination of silanes of the formula $SiCl_4$ and $RSiCl_3$ may be used but only limited amounts of silanes of the formula $R_2SiCl_2$ and $R_3SiCl$. When the number of R groups exceeds the value 1.5, gels or fluids are obtained rather than powdery materials.

Examples of individual silanes which are operative in this invention are $SiCl_4$, $HSiCl_3$, methyltrichlorosilane, dimethyldichlorosilane, trimethylchlorosilane, phenyltrichlorosilane, diethyldichlorosilane, triphenylchlorosilane, hexyltrichlorosilane, methyldichlorosilane, ($CH_3SiHCl_2$) diphenyldichlorosilane, phenylhexyldichlorosilane and phenylethyldichlorosilane.

The term "inert gas" as employed in this invention means any gas or vapor which does not react with chlorosilanes under normal conditions (i. e. at temperatures below 150° C.). Examples of inert gases which are operative in the invention are air, nitrogen, oxygen, hydrogen, carbon dioxide, carbon monoxide, $SO_2$, $NO_2$, phosphine, trimethylamine, argon, helium, HCl, methane, ethane, butadiene, methyl chloride and dimethylether together with the vapors of higher boiling materials such as hydrocarbon halides, ethers, hydrocarbons, nitriles, nitro compounds and tertiary amines. In general, those materials which contain active hydrogens such as water, $H_2S$, ammonia, carboxylic acids, alcohols, primary and secondary amines and mercaptans are not suitable since they react with chlorosilanes. It is preferred that the material employed as the inert gas have a boiling point below 100° C.

The chlorosilanes and the inert gas may be mixed in any convenient fashion. For example, the inert gas may be passed through the liquid chlorosilane at any convenient temperature. With those low boiling chlorosilanes such as silicon tetrachloride, trichlorosilane, or methylchlorosilanes, the gas may be passed through at room temperature or below. With higher boiling chlorosilanes such as phenyltrichlorosilane, it is convenient to heat the chlorosilane as the gas is being passed through. Alternatively, the chlorosilane may be first vaporized by heating and then mixed with the inert gas or the chlorosilane may be sprayed into a stream of the inert gas.

The inert gas-silane vapor mixtures may be contacted with water in any convenient manner. One method is that of passing the silane-gas mixture through water. Another method is that of spraying water into an atmosphere of the silane-gas mixture. Still a third method is that of mixing steam with the silane-gas mixture. Regardless of the method of preparation, the temperature at which the hydrolysis takes place is not critical. It may range from the freezing point of the hydrolysis media up to above it boiling point, although preferably the reaction is carried out below 150° C.

The preferred method of hydrolysis is to pass the silane-gas mixture through water at room temperature. No special gas dispersion means is required. A simple glass tube is sufficient as a gas inlet. During the hydrolysis the concentration of HCl in the water may build up to 34 to 40 per cent. This does not deleteriously affect the product. In fact, it is often desirable to start with aqueous HCl as the hydrolysis medium. The powdered siloxanes may be collected by filtering or skimming off the surface of the hydrolysis bath. They are then washed and dried.

The amount of water present is not critical, although it should be sufficient to completely remove all of the chlorine from the silicon (i. e. in amount equivalent to the chlorine). In practice, an excess of water is employed, since this facilitates handling of the hydrolysis product.

When the chlorosilane mixture is contacted with water as above described, finely divided powdery materials are obtained. These vary somewhat in fineness depending upon the concentration of the silane in the gas and upon the rate at which the gas is added.

It has been found that the amount of silane in the silane-gas mixture should be less than 80 per cent by volume based upon the total mixture. When more than this amount of silane is employed the hydrolysis product is a gel-like or resinous material rather than a finely divided powder. The lower limit of the silane concentration is not critical, although preferably the silane should be present in amount of at least .1 per cent by volume. Thus the preferred concentration of silane in the inert gas mixture varies from .1 per cent by volume to 80 per cent by volume.

The properties of the powdered siloxanes obtained by the method of this invention vary depending upon the silanes employed. When the silane is silicon tetrachloride or trichlorosilane, a finely divided hydrophilic silica is obtained. When alkyl and phenyl chlorosilanes are hydrolyzed either alone or mixed with trichlorosilane or silicon tetrachloride, then the products obtained are finely divided hydrophobic powders.

The product of this invention may be employed for any of those uses for which silica is normally employed. Some of them may also be employed as molding compositions.

The following examples are illustrative only and are not to be construed as limiting the invention which is properly delineated in the appended claims.

*Example 1*

Vent gas from the ferrosilicon process was employed in this experiment. The gas was composed of about 5 per cent by volume of a mixture of chlorosilanes consisting of monomethyltrichlorosilane, dimethyldichlorosilane, trimethylchlorosilane, HSiCl$_3$, CH$_3$SiHCl$_2$, SiCl$_4$, together with about 95 per cent by volume of a mixture of methyl chloride, hydrogen and gaseous hydrocarbons, including methane and ethane. The ferrosilicon process comprises reacting a mixture of methyl chloride and HCl with a copper silicon mixture.

The vent gas was bubbled through a 20 to 25 per cent aqueous solution of HCl. A finely divided powder was skimmed off the top of the hydrolysis bath and thereafter washed and dried. The siloxane powder was hydrophobic and had a bulk density of 10.1 pounds per cu. ft. The powder had a carbon to silicon ratio of 0.17 and a silicon bonded hydrogen to Si ratio of .46.

*Example 2*

Dry nitrogen gas was bubbled through silicon tetrachloride at 25° C. and the effluent gas was bubbled through an aqueous solution of HCl. A finely divided powder formed on top of the hydrolysis bath and was skimmed off and washed and dried. The resulting material was a hydrophilic silica powder having a bulk density of 14.75 pounds per cu. ft.

*Example 3*

The above run was repeated employing HSiCl$_3$ except that the nitrogen was bubbled through the silane at a temperature of 0° C. and a 35 to 40 per cent aqueous HCl solution was employed as a hydrolysis medium. The resulting product was a hydrophilic silica powder having a bulk density of 4.64 pounds per cu. ft.

*Example 4*

The process of Example 2 was repeated except that dry HCl was used as the inert gas. The resulting product was a hydrophilic powder having a bulk density of 4.8 pounds per cu. ft.

*Example 5*

A series of runs were carried out by passing nitrogen through chlorosilanes or mixed chlorosilanes as shown in the table below. The effluent gas was then passed into a 30 to 40 per cent aqueous HCl solution. The resulting finely divided hydrophobic powders were then removed from the top of the hydrolysis bath and were washed and dried. These powders had the properties shown in the table below. In all cases, the nitrogen was passed through the chlorosilane at 25° C. except when phenyltrichlorosilane was employed, in which case the silane was heated to 100° C. and the gas then bubbled through. In all cases except run 1, the chlorosilanes were in separate flasks and the mixing occurred after vaporization. In run 1, the chlorosilanes were mixed before vaporization.

TABLE

| No. | Chlorosilanes | | Mol. Ratio of A/B in Effluent Gas | Bulk Density, Lbs./cu. ft. |
|---|---|---|---|---|
| | A | B | | |
| 1 | SiCl$_4$ | (CH$_3$)$_3$SiCl | 1.0 | 15.27 |
| 2 | CH$_3$SiCl$_3$ | | | 11.10 |
| 3 | SiCl$_4$ | CH$_3$SiCl$_3$ | 0.53 | 8.40 |
| 4 | CH$_3$SiCl$_3$ | C$_6$H$_5$SiCl | 4.36 | 8.86 |
| 5 | C$_6$H$_5$SiCl$_3$ | | | 24.80 |
| 6 | SiCl$_4$ | C$_3$H$_7$SiCl$_3$ | 0.34 | 20.00 |
| 7 | SiCl$_4$ | C$_6$H$_5$SiCl$_3$ | 1.90 | 15.10 |

*Example 6*

A mixture of 4.81 gram mols of phenyltrichlorosilane, 4.9 gram mols of methyltrichlorosilane and 3.6 gram mols of dimethyldichlorosilane was prepared and vaporized by dropping the mixture into a heating flask through which a stream of nitrogen was being passed. The rate of the addition of the chlorosilanes and nitrogen was such that the effluent stream contained 0.5 per cent by volume of the mixed chlorosilane vapors. The effluent gas was passed through a 20 per cent aqueous HCl solution at 25° C. The resulting powder was removed from the surface of the hydrolysis medium, washed and dried at room temperature under reduced pressure. The product was a light fluffy powder which was molded in a press at 175° C.

That which is claimed is:

1. A method of preparing powdered siloxanes which comprises mixing a chlorosilane of the formula R$_n$SiCl$_{4-n}$ where $n$ has a value from 0 to 1.5 and R is selected from the group consisting of alkyl radicals of less than 7 carbon atoms, phenyl radicals, and hydrogen atoms, there being not more than 1 hydrogen atom per silicon, with an inert gas in amount such that the per cent by volume of chlorosilane vapor in the silane-gas mixture is less than 80 per cent, and thereafter contacting the silane-gas mixture with water, under acid conditions, whereby the silane is hydrolyzed to a powdery siloxane.

2. The method in accordance with claim 1 in which the silane-gas mixture is passed into water, under acid conditions.

3. The method in accordance with claim 1 in which the silane is SiCl$_4$.

4. The method in accordance with claim 1 in which the silane is a mixture of dimethyldichlorosilane, methyltrichlorosilane and phenyltrichlorosilane.

References Cited in the file of this patent

UNITED STATES PATENTS

| Number | Name | Date |
|---|---|---|
| 2,378,290 | Drake | June 12, 1945 |
| 2,412,470 | Norton | Dec. 10, 1946 |
| 2,483,373 | Rochow | Sept. 27, 1949 |

OTHER REFERENCES

Stock et al., Berichte der Deut. Chem. Gesel. vol. 52, 1919, pages 695, 704 and 705.